US006806873B1

(12) United States Patent
Lake et al.

(10) Patent No.: US 6,806,873 B1
(45) Date of Patent: Oct. 19, 2004

(54) CODING A VECTOR (75) Inventors: Adam T. Lake, Beaverton, OR (US); Christopher L. Gorman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/433,804

(22) Filed: Nov. 3, 1999

(51) Int. Cl.[7] .............................................. G06T 15/00
(52) U.S. Cl. ...................................................... 345/419
(58) Field of Search ................................ 345/419, 420, 345/422, 424

(56) References Cited

PUBLICATIONS

"3D Geometry Compression," Gabriel Taubin and Jarek Rossignac. SIGGRAPH '98 Course Notes, 1998.
"Geometry Compression," M. Deering, *Computer Graphics.* SIGGRAPH '95, pp. 13–20, 1995.
"Optimized Geometry Compression for Real–Time Rendering," M. Chow, *IEEE Visualization*, '97, pp. 347–354, Oct. 1997.

*Primary Examiner*—Phu K. Nguyen
(74) *Attorney, Agent, or Firm*—Fish & Richardson P.C.

(57) ABSTRACT

An input vector is coded by obtaining a subdivision surface having vectors associated with bit patterns, and locating a target vector on the subdivision surface that is within a range of the input vector. The subdivision surface may be obtained by dividing an original surface. A bit pattern of the target vector is assigned to the input vector.

20 Claims, 9 Drawing Sheets

CODING A VECTOR

BACKGROUND OF THE INVENTION

This invention relates to coding a vector.

Normalized vectors ("normals") are included, for example, in data for a three-dimensional ("3D") model. Vertex and face normals are often stored along with polygons that make up the 3D model, and are used in determining the shading of the 3D model. The vertex normals may be determined using smoothing information or the like and can be modified by a user to enhance the smoothness or sharpness of edges in the 3D model.

Normalized vectors are also used in other areas of computer graphics where a direction vector is needed, such as animation, imaging and video processing. For example, animation data for 3D models contains normalized vectors that describe bone angles of an animated character in each frame of motion. Video compression uses motion estimation techniques which also rely on normalized vectors.

When storing the 3D model, or transmitting it over a network such as the Internet, it is advantageous to reduce the amount of data that must be stored/transmitted. Coding techniques may be employed to code vectors in the 3D model and thus reduce the amount of data for storage/transmission.

SUMMARY OF THE INVENTION

In general, in one aspect of the invention, a method for coding an input vector (such as a face or vertex vector of a 3D model) includes locating a target vector on a subdivision surface that is within a range of the input vector. A value associated with the target vector is assigned to the input vector.

Among the advantages of the invention are one or more of the following. Coding vectors using a subdivision surface reduces the amount of data that must be stored/transmitted for a 3D model. Other coding techniques may be employed to reduce the amount of data even further.

Other advantages and features will become apparent from the following description and the claims.

DESCRIPTION

Figure 1:
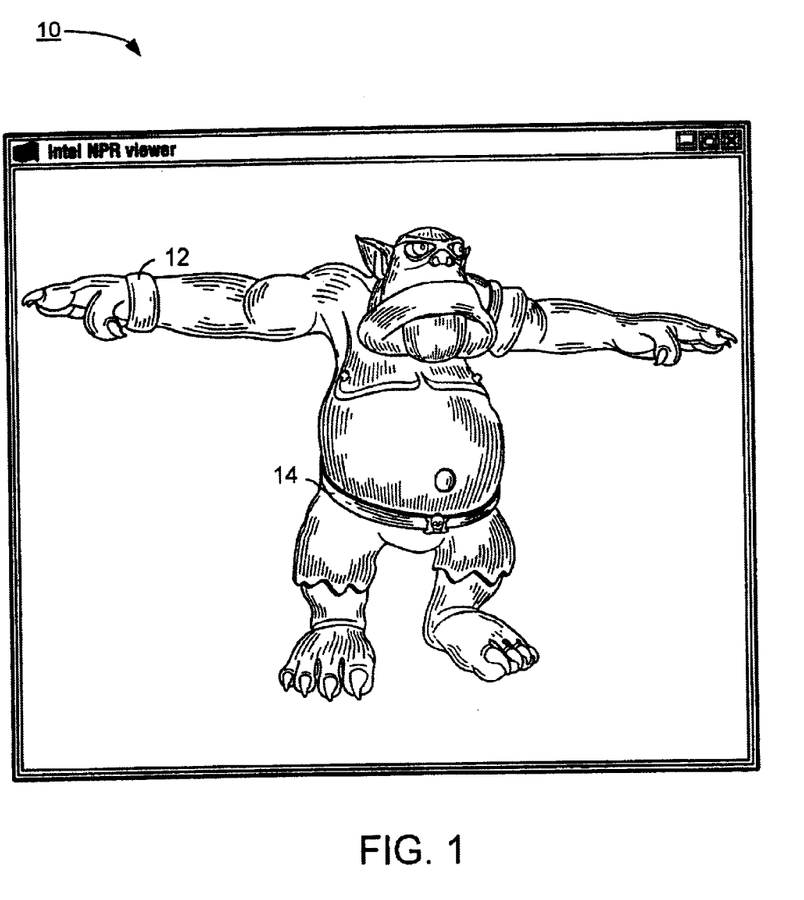
FIG. 1 is a view of a 3D model.
Figure 2:
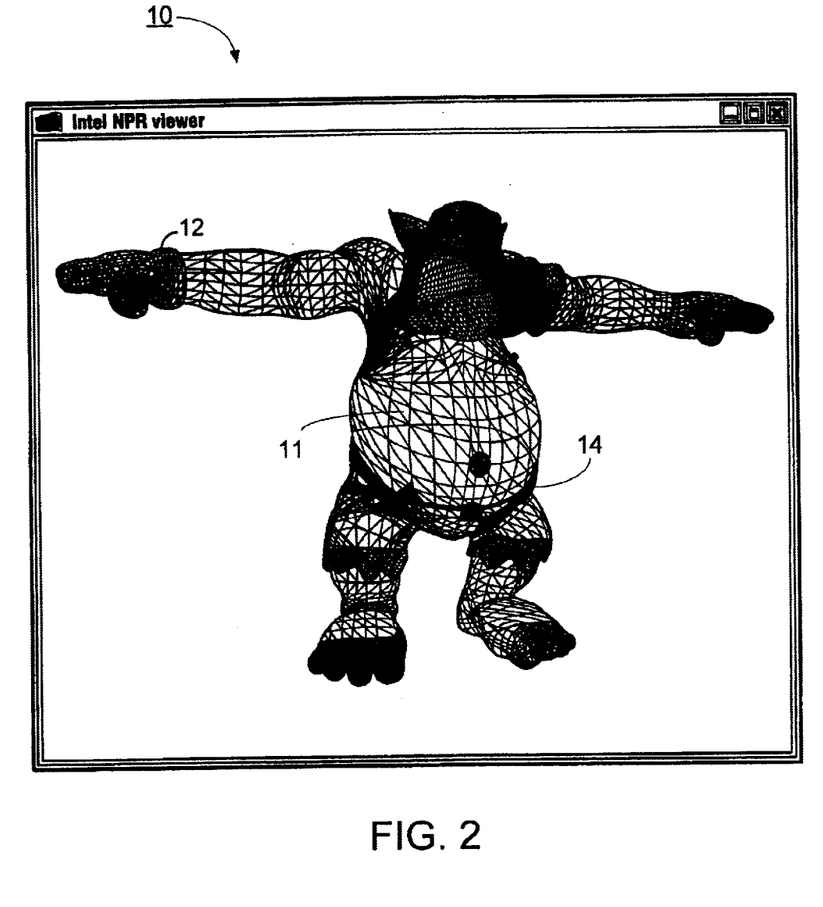
FIG. 2 is a view showing polygons in the 3D model.

As shown in FIGS. 1 and 2, 3D model 10 is comprised of interconnecting polygons 11. Polygons 11 are triangles in this embodiment; however, other types of polygons may be used. Groups of polygons are organized into meshes, each of which corresponds to an element of 3D model 10. For example, arm band 12 and belt 14 each correspond to a different mesh in 3D model 10.

Figure 3:
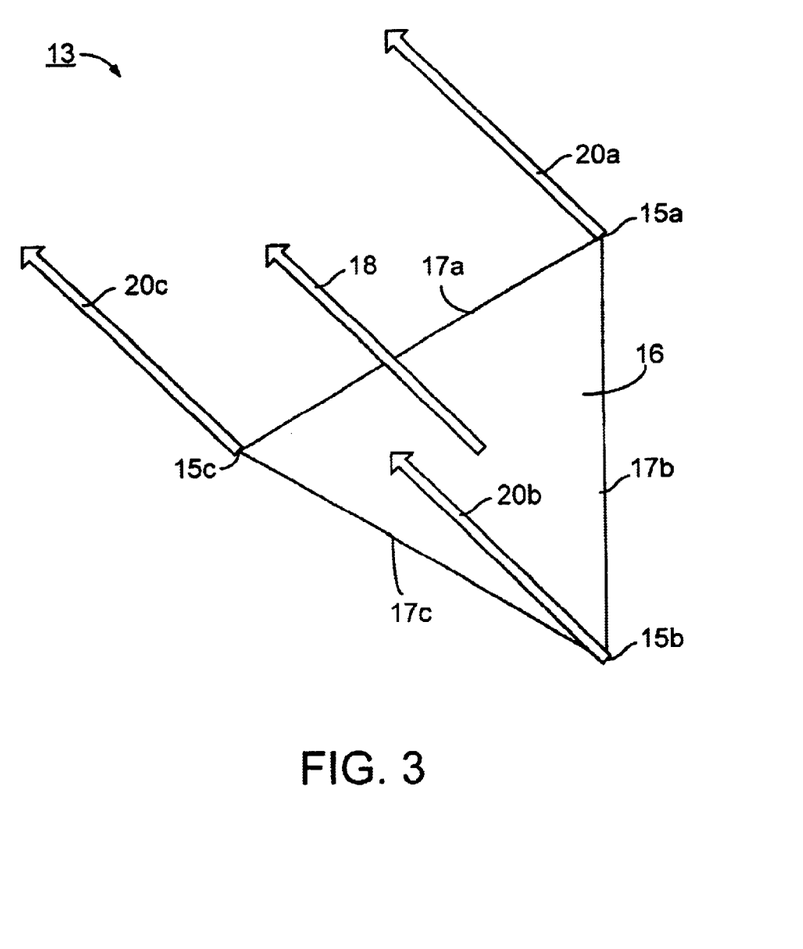
FIG. 3 is a close-up view of a polygon.

As shown in FIG. 3, the 3D data for each triangular polygon 13 is comprised of coordinates for three vertices 15a to 15c positioned in xyz (or other) space. These vertices define a face 16 and edges 17a to 17c for each polygon. Vertex normals 20a to 20c are also included in the data. These vectors are used during image rendering. Face normal 18 may be determined from edges 17a to 17c.

Conventional 3D rendering systems use "floating point" normals, in which each xyz coordinate of a normal is represented using thirty-two bits (for a total of ninety-six bits per normal). As the number of normals in a 3D model increases, the number of bits for that model increases dramatically. As a result, more memory/bandwidth is required to store/transmit data for the 3D model. The coding processes described below reduce the number of bits per normal, making it easier and cheaper to store and/or transmit such data.

Figure 4:
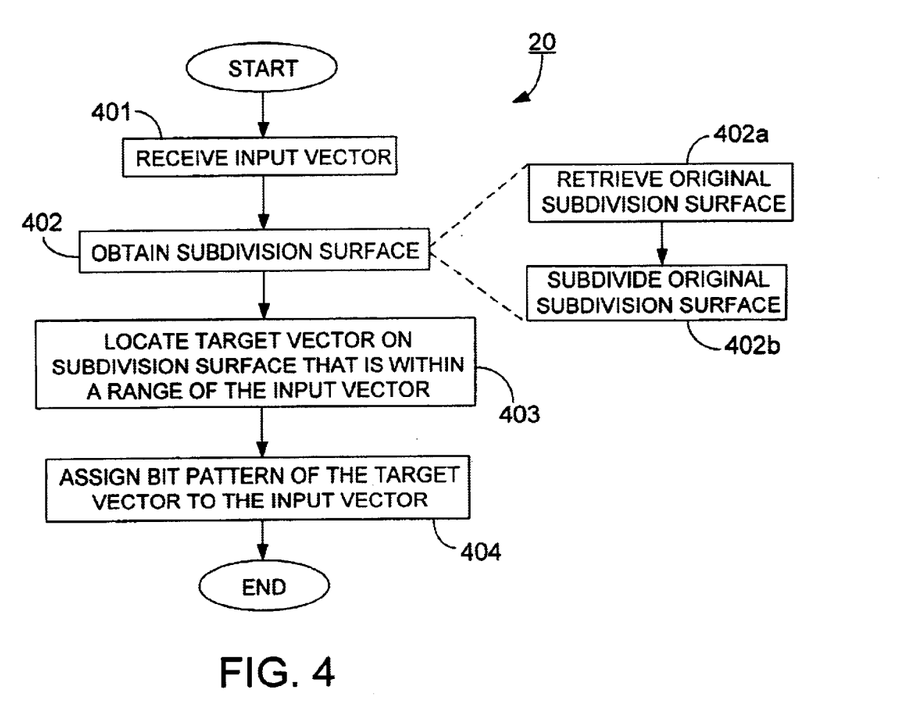
FIG. 4 is a flow diagram of a quantization coding process according to one embodiment of the invention.

The quantization coding process 20 of FIG. 4 begins by receiving an input (normal) vector in 401 and obtaining a tetrahedron or other suitable subdivision surface in 402. The orientation and labeling of the tetrahedron faces is stored in memory so that a reverse (dequantization) process can be performed during decoding. The subdivision surface is generated at run-time based, for example, on the input vector. The subdivision surface is not part of the model itself. Rather, it is a reference surface that contains reference normals that are used for coding normal vectors in 3D model 10. Coding is performed using an ordered set of two-bit face indices of the subdivision surface.

Figure 5A:
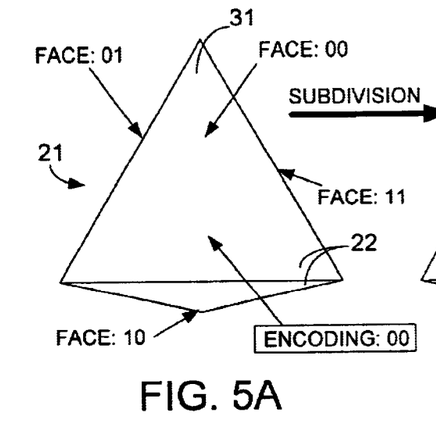
FIGS. 5a to 5d are views of subdivision surfaces.
Figure 5B:
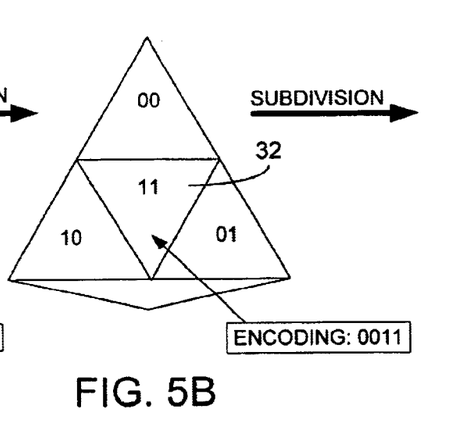
Figure 5C:
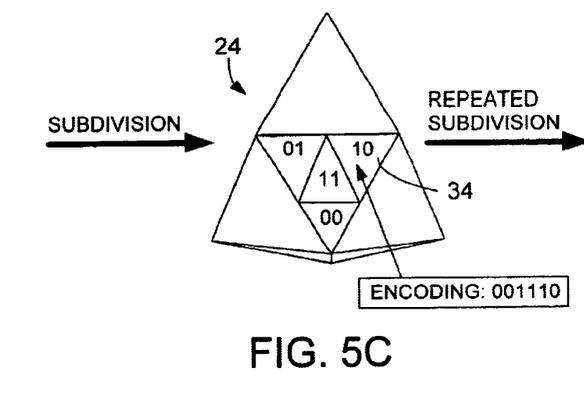
Figure 5D:
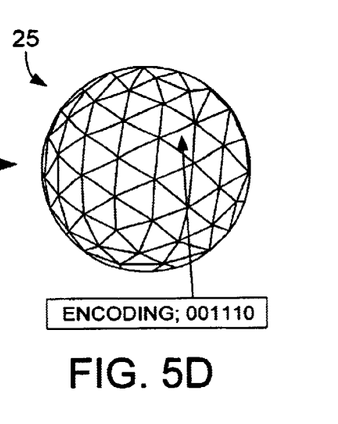

More specifically, a subdivision surface is a 3D object, such as tetrahedron 21 of FIG. 5a, having surfaces that can be divided to obtain other 3D objects. For example, faces 22 of tetrahedron 21 may be subdivided along their centers (FIG. 5b), and the resulting subdivisions connected in 3D space to obtain subdivision 24 (FIG. 5c). This process may be repeated several times to obtain subdivision surface 25 of FIG. 5d. If the process is repeated ad infinitum, the resulting subdivision surface is a sphere. This is called the "limit surface".

Figure 6:
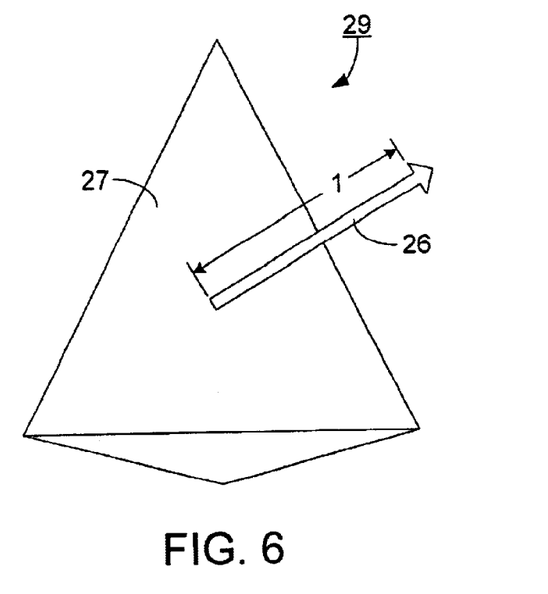
FIG. 6 is a view of a reference vector on a tetrahedron.

A reference vector is defined for each face of the subdivision surface. As shown in FIG. 6, a reference vector 26 is normal to a face 27 of tetrahedron (subdivision surface) 29 and has a length of one unit (where "unit" can be any unit of measurement). One such vector is defined for each face of tetrahedron 29 (though only one vector is shown in FIG. 6). The more faces a subdivision surface has (i.e., the more the surface is subdivided), the more reference vectors are defined by that subdivision surface. For example, subdivision surface 24 (FIG. 5c) defines more reference vectors than subdivision surface 21 (FIG. 5a), and subdivision surface 25 (FIG. 5d) defines more reference vectors than either of subdivision surfaces 21 or 24. The reference vectors are full-precision vectors. A path describing the subdivided faces (the quantized vector) leads to a reference vector on the subdivision surface.

More specifically, each face of a subdivision surface is associated with a unique address value path. This address value is a combination of a bit pattern for the current face and the bit patterns of faces that were previously divided to obtain the current face. For example, in FIGS. 5a and 5b, face 31 has a bit pattern of "00" and face 32 has a bit pattern of "11". Therefore, the address of face 32 is bit pattern "0011" (a combination of "00" and "11"). Taking this process one step further, face 34 (FIG. 5c) has a bit pattern of "10". Therefore, the address of face 34 is "001110", which is a combination of the bit patterns from faces 31, 32 and 34. A reference vector for each face is assigned the bit pattern (or quantized vector) of its corresponding face.

Returning to FIG. 4, a subdivision surface is obtained by retrieving an original subdivision surface in 402a and dividing the surface in 402b, if necessary, to obtain a surface that is acceptably close to having a vector that is parallel to the vector being coded. In 402b, only the surfaces under consideration are divided—the entire subdivision surface (e.g., 5a to 5d) is not divided, since that would require unnecessary processing. For example, referring to FIG. 5a, if face 31 "00" is selected, only that face is subdivided in 402b (faces "01", "10", and "11" of tetrahedron 21 are not subdivided). If face 32 "11" is then selected for subdivision (FIG. 5b), only that face is subdivided, the remaining faces resulting from the subdivision of original face 32, namely faces "00", "10", and "01" of FIG. 5b, are not subdivided. The remaining faces of FIG. 5b are also not subdivided.

Whether subdivision even takes place is a function of the level of accuracy desired in the coding process. A subdivision surface with a large number of reference vectors is likely to produce more accurate coding than a subdivision surface with fewer reference vectors. Thus, a user can decide the level of coding accuracy desired, and then the appropriate amount of subdivisions will be performed in 402b to obtain that level of accuracy. A graphical user interface (not shown) may be provided to specify the level of coding accuracy.

The appropriate reference (target) vector on the subdivision surface is located (403) by identifying a reference vector on the subdivision surface that is within a predetermined range of the input vector. The range is determined by taking vector dot products of the input vector and each reference vector on the subdivision surface. If the comparison is within a specified error tolerance or if it has reached a maximum number of subdivisions, process 20 is completed. Otherwise, process 20 repeats using the faces generated during the previous subdivision.

The dot products of the input vector and the reference vectors will be between "1" and "-1". A value of "1" indicates that the input and reference vectors are pointing in the same direction; a value of "-1" indicates that the vectors are pointing in opposite directions; and a value of "0" indicates that the vectors are orthogonal. The reference vector that is closest to the input vector will produce a dot product that is "1" or nearest to "1".

In 404, the bit pattern (or quantized vector) of a reference vector that is closest to the input vector is assigned to the input vector. For example, if the reference vector of face 34 (FIG. 5c) is closest to the input vector, then "001110" is assigned to the input vector (this is illustrative only since, as noted, entire surfaces, such as FIG. 5c, are not subdivided, only relevant faces thereof). Filler bits may also be added to achieve a particular bit precision. For example, since every two bits can encode four vectors ("00", "01", "10", and "11"), with six bits, sixty-four vectors can be encoded (the number of normals that can be encoded equals $4^{\#bits/2}$, where #bits refers to the number of bits used to code each of the vectors). Using eighteen bits (nine subdivisions) results in a high degree of coding accuracy.

The bits may also be entropy encoded to reduce the number of bits per vector to between eight and sixteen bits (for eighteen-bit vectors). Examples of entropy encoding that may be used include Huffman coding, run-length coding, and arithmetic coding.

Quantization coding process 20 may be incorporated into a predictive coding scheme, such as that shown in block diagram 40 (FIG. 7), in order to achieve even further bit reductions. 3D vectors are input to block diagram 40 at 41, coded, and then output at 42 to a memory, network (such as the Internet), or other destination. The coding is performed using predictor 44, quantizer 45, entropy encoder 46, entropy decoder 47, and de-quantizer 49.

Figure 7:
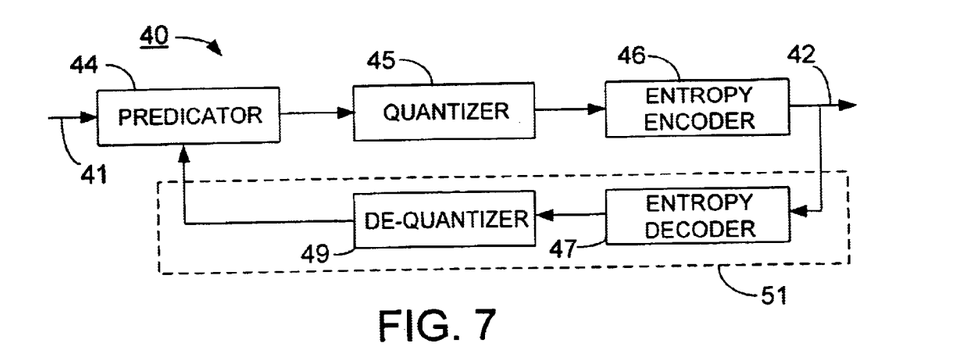
FIG. 7 is a block diagram of a vector coding process according to one embodiment of the invention.

Entropy encoder 46 performs entropy encoding using entropy encoding techniques such as those noted above. Entropy decoder 47 performs entropy decoding. Quantizer 45 quantizes vectors in accordance with quantization coding process 20 (FIG. 4). De-quantizer 49 de-quantizes the coded vectors, meaning that it obtains reference vectors from a subdivision surface using the bit patterns (quantized vectors) resulting from quantization coding process 20.

Predictor 44 takes advantage of the inherent predictability of ordered normals in a 3D model in order to predict a location of a succeeding normal based on previously-received normals. Predictor 44 includes a predictor function, $r=p(n, h)$, where r defines an amount of movement (in this embodiment, rotation) to be applied to a predicted vector based on a previous vector n and a history of all previous vectors h. For example, if the previous vectors h all differ in orientation by −1°, r may predict a vector that is −1° off from the previous normal n. Similarly, if all previous vectors are at the same angle of rotation, then r might predict the next vector as being at that angle.

The amount of movement defined by r indicates how much the predicted vector must be rotated so that it aligns to a reference vector. This amount of movement is applied to an actual (or "next") vector in order to orient as many vectors as possible in the same direction as the reference vector. Ways of specifying the amount of movement include a rotation matrix (determined based on r), a quaternion, and a function that rotates a vector without affecting its length.

Figure 8:
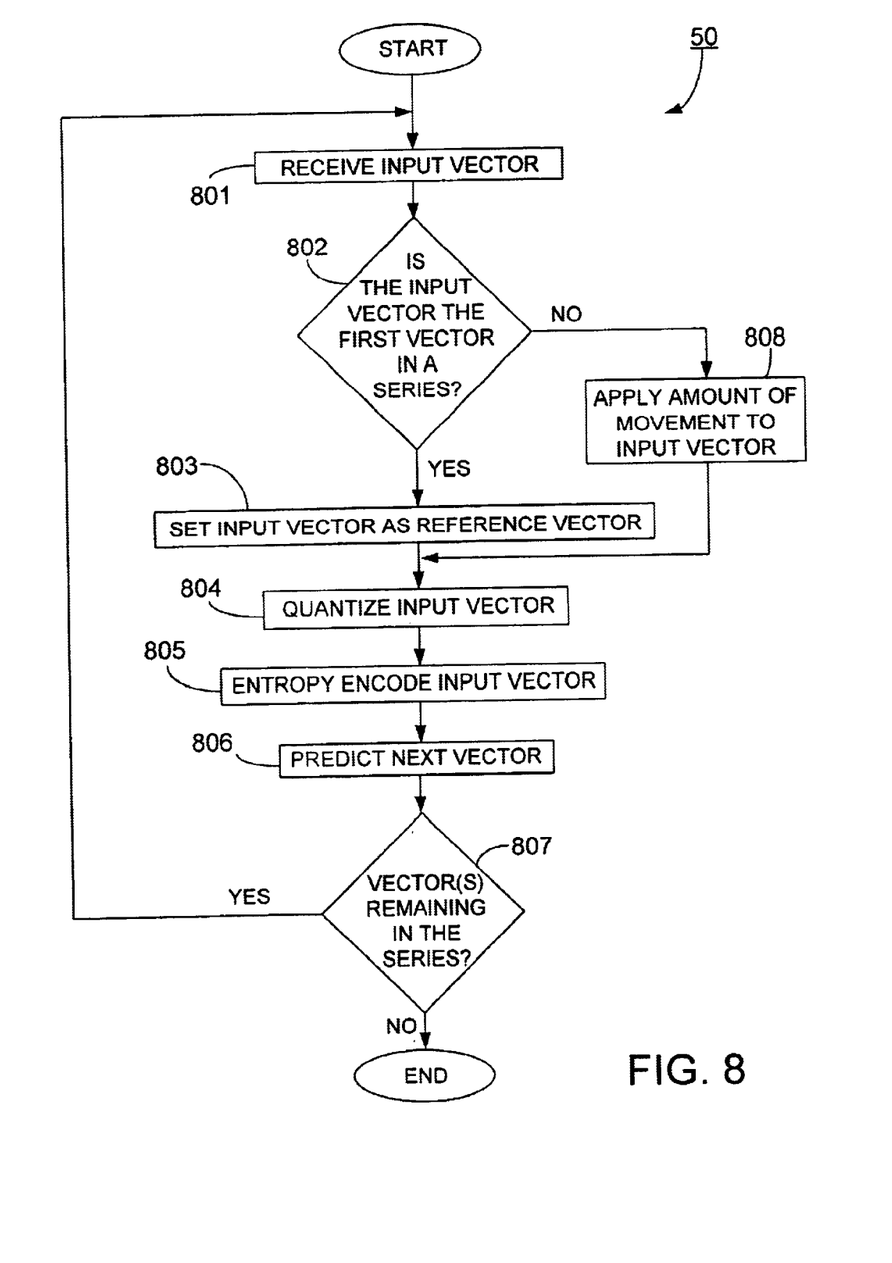
FIG. 8 is a flow diagram for the vector coding process of FIG. 7.

In FIG. 8, a process 50 is shown which explains the operation of block diagram 40. An input vector is received at predictor 44 in 801. If the input vector is a first vector in a series (such as a 3D-model bitstream) (802), then the input vector is set as the reference vector in 803 and forwarded to quantizer 45. Quantizer 45 quantizes the input vector at 804 in accordance with quantization coding process 20 (FIG. 4). The resulting quantized vector is provided to entropy encoder 46, where it is entropy-encoded in 805. The resulting entropy encoded vector is output at 42 and provided to feedback loop 51.

Figure 9:
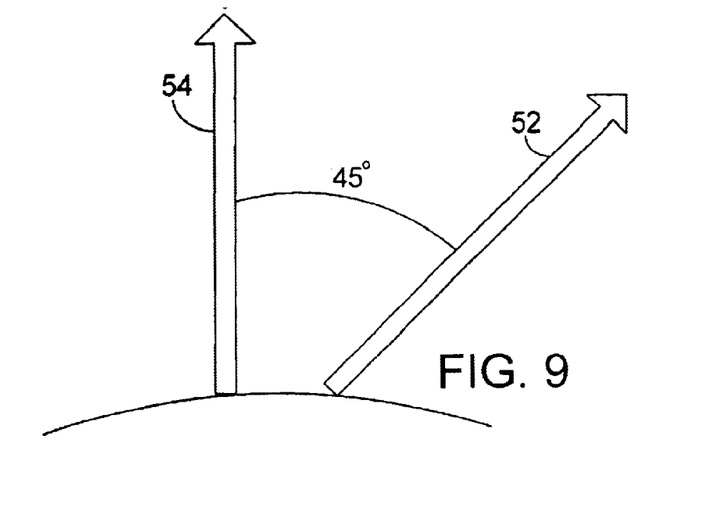
FIG. 9 shows a vector and a predicted vector.

In feedback loop 51, entropy decoder 47 decodes the entropy-encoded vector and provides the resulting decoded vector to de-quantizer 49. De-quantizer 49 de-quantizes the decoded vector and provides the resulting de-quantized vector to predictor 44. In 806, predictor 44 determines a predicted vector based on the predictive function r described above. This predicted vector constitutes an estimation of an amount by which a next input vector must be moved to align it to the reference vector. For example, as shown in FIG. 9, predicted vector 52 may need to be rotated by 45° to align it to reference vector 54.

Passing through 807, a next vector is received in 801. Since this next vector is not the first vector in the series (802), processing proceeds to 808. There, predictor 44 applies the amount of movement determined for the predicted vector (determined in 806) to the next vector. If the predictor function is accurate, then the next vector will be aligned with the reference vector or within a range of the reference vector that results in the same quantized vector. In this case, quantization 804 and entropy encoding 805 would result in data that duplicates the data for the reference vector. This enhances compression, since data for the reference vector could be used for the next vector, eliminating the need to transmit data for both vectors.

Following entropy encoding in 805, a predictive vector is determined based on the next vector in 806, and the process is repeated for remaining vectors in the series.

Figure 10:
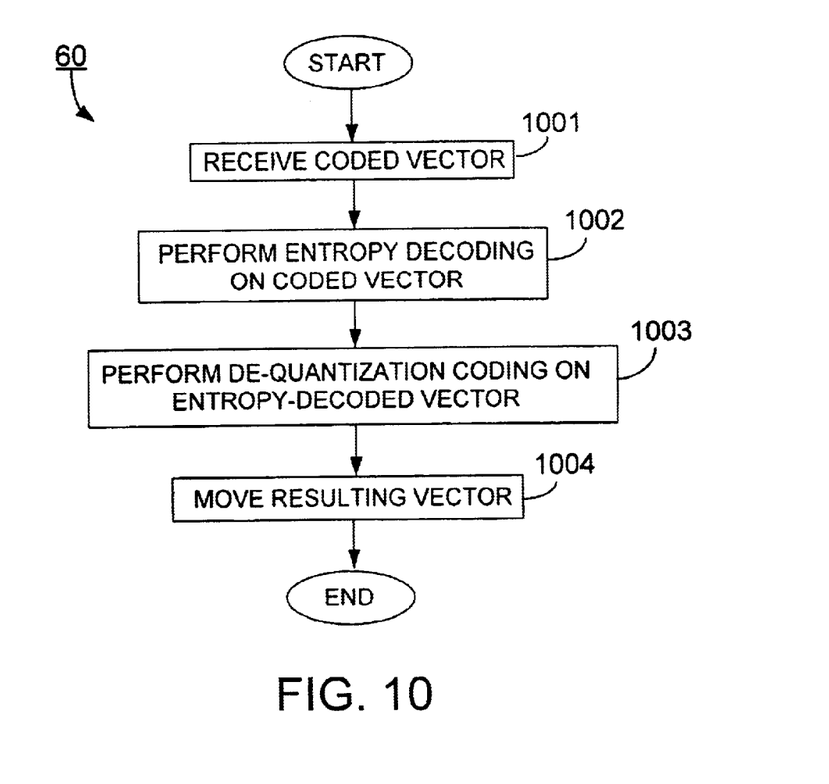
FIG. 10 is a flow diagram showing a vector decoding process according to one embodiment of the invention.

Decoding of the coded vectors is substantially the inverse of the coding process. In FIG. 10, decoding process 60 includes receiving data for coded vectors in 1001, and performing entropy decoding on the data in 1002. The resulting decoded data is then subjected to de-quantization in 1003. De-quantization is performed by following the "path" defined by the quantization vector to obtain a subdivision surface having an appropriate reference vector. For example, if the quantized vector is "0011", then face 31 (FIG. 5a) is selected (from the "00" of "0011") and subdivided. Then the reference vector associated with face 32 (FIG. 5b) is selected (from the "11" of "0011") and identified as the reference vector that corresponds to the quantized vector. During decoding, the process can stop at any subdivision surface. While less accurate results may be obtained if the subdivisions are not carried out for the entire quantized vector, there may be other benefits, such as speed, that result.

The resulting vectors are then moved (e.g., rotated) in 1004 in accordance with a function that is the inverse of the rotation matrix, quaternion, or function used to move the vectors during the coding process. This function may be pre-loaded into the decoder or downloaded from an external source such as a network.

Figure 11:
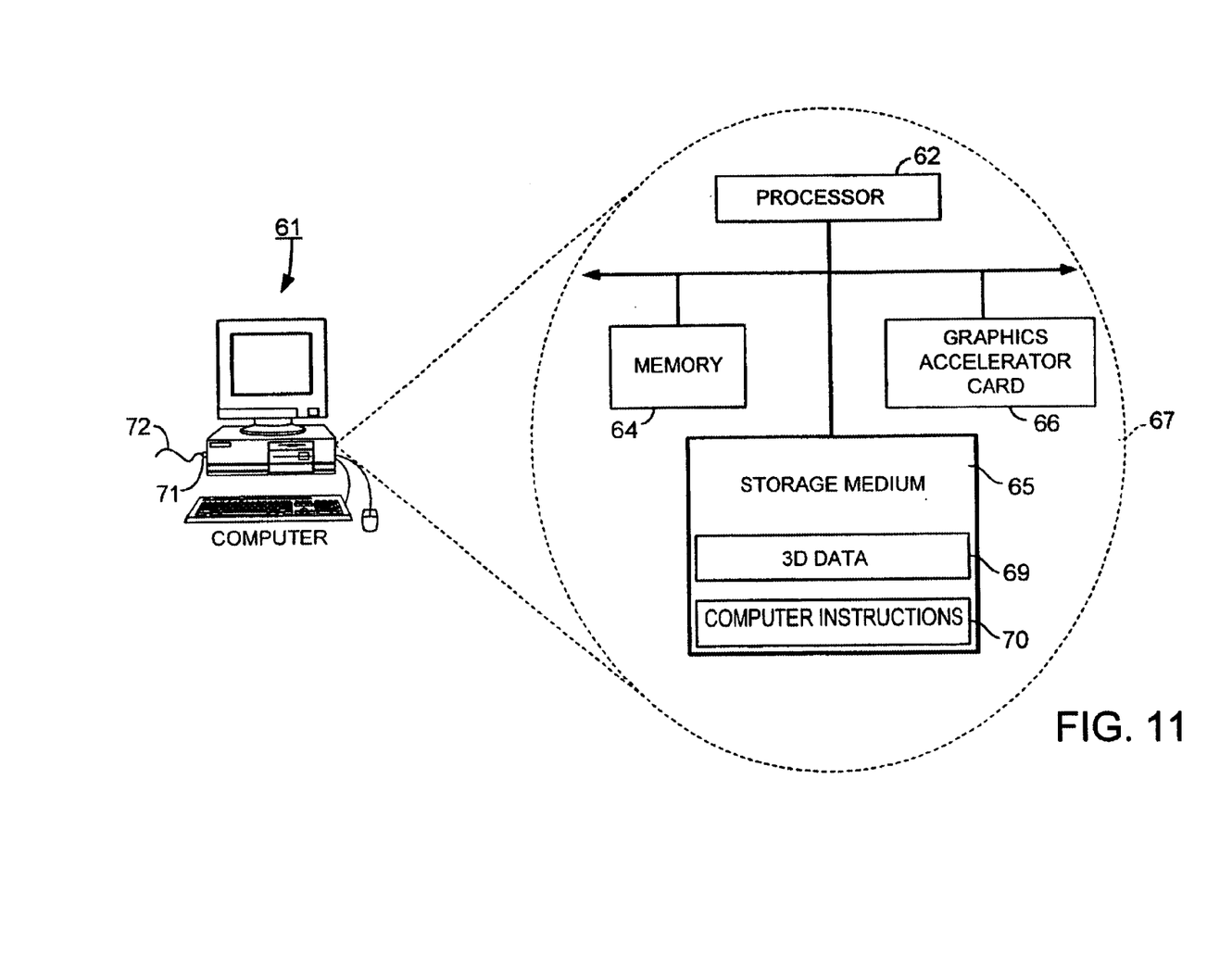
FIG. 11 is a view of computer hardware used to implement one embodiment of the invention.

FIG. 11 shows a computer 61 for performing processes 20, 50 and/or 60. Computer 61 includes a processor 62, a memory 64, a storage medium 65 (e.g., a hard disk), and a 3D graphics accelerator card 66 for manipulating 3D data (see view 67). Storage medium 65 stores 3D data 69 which includes face normals, and computer instructions 70 for performing processes 20, 50 and/or 60. An output port 71 provides coded and uncoded data to a network medium 72.

Processes 20, 50 and 60, however, are not limited to use with any particular hardware or software configuration; they may find applicability in any computing or processing environment. Processes 20, 50 and 60 may be implemented in hardware, software, or a combination of the two. Processes 20, 50 and 60 may be implemented in computer programs executing on programmable computers that each include a processor, a storage medium readable by the processor (including volatile and non-volatile memory and/or storage elements). Program code may be applied to data entered using an input device to perform processes 20, 50 and 60, and to generate output data.

Each such program may be implemented in a high-level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer when the storage medium or device is read by the computer to perform processes 20, 50 and 60. Processes 20, 50 and 60 may also be implemented as a computer-readable storage medium, configured with a computer program, where, upon execution, instructions in the computer program cause the computer to operate in accordance with processes 20, 50 and 60.

The invention is not limited to the embodiments described above. For example, vertex (or other) vectors may also be coded/decoded using processes 20, 50 and/or 60. Other embodiments not described herein are also within the scope of the following claims.

What is claimed is:

1. A computer graphics system comprising:

a graphics accelerator card for processing three-dimensional graphics data;

a memory for storing executable instructions;

a processor for executing the executable instructions to code the three-dimensional graphics data; and a network connection over which coded three-dimensional graphics data is output to a network;

wherein the processor codes a selected vector in the three-dimensional graphics data using a three-dimensional subdivision surface having plural faces, each of the plural faces containing a single vector and having a numerical code, the processor executing instructions to perform coding by:

receiving an input indicative of a level of coding accuracy;

subdividing the subdivision surface in accordance with the input;

identifying a face of the subdivision surface that contains a vector that is closest to being parallel to the selected vector;

determining if the vector is within a predetermined range of the selected vector;

wherein, if the vector is within the predetermined range, the processor assigns the selected vector a numerical code comprised of a numerical code of the face and of any faces previously subdivided to obtain the face; and wherein, if the vector is not within the predetermined range of the selected vector, the processor subdivides only the face, leaving other faces of the subdivision surface undivided, to produce a subdivided face and repeats identifying, determining, and assigning or subdividing using the subdivided face.

2. The system of claim 1, wherein the processor codes the selected vector based on bit pattern values.

3. A method of coding an input vector using a three-dimensional subdivision surface having plural faces, each of the plural faces containing a single vector and having a numerical code, the method comprising:

receiving an input indicative of a level of coding accuracy;

subdividing the subdivision surface in accordance with the input;

identifying a face of the subdivision surface that contains a vector that is closest to being parallel to the input vector;

determining if the vector is within a predetermined range of the input vector;

wherein, if the vector is within the predetermined range, the method further comprises assigning the input vector a numerical code comprised of a numerical code of the face and of any faces previously subdivided to obtain the face; and wherein, if the vector is not within the predetermined range of the input vector, the method further comprises subdividing only the face, leaving other faces of the subdivision surface undivided, to produce a subdivided face and repeating identifying, determining, and assigning or subdividing using the subdivided face.

4. The method of claim 3, further comprising:

determining a predicted vector based on the input vector, the predicted vector defining an amount of movement needed to move a next vector toward the input vector; and coding the next vector based on the predicted vector.

5. The method of claim 4, wherein coding comprises:

applying the amount of movement to the next vector;

locating a target vector on the subdivision surface that is within a range of the next vector; and assigning a value associated with the target vector to the next vector.

6. The method of claim 3, further comprising entropy encoding the value of the vector.

7. The method of claim 3, wherein determining if the vector is within a predetermined range of the input vector comprises obtaining a vector dot product of the vector and the input vector.

8. The method of claim 3, further comprising:

keeping track of a number of face subdivisions; and determining if the number of face subdivisions exceeds a predetermined maximum number of face subdivisions;

wherein, if the number of face subdivisions exceeds the predetermined maximum number of face subdivisions, the method further comprises assigning the input vector a numerical code of the face and of any faces previously subdivided to obtain the face regardless of whether the vector is within the predetermined range of the input vector.

9. The method of claim 3, wherein the numerical code comprises a bit pattern, each face and each subdivided face having a same number of bits for a numerical code.

10. An article comprising a machine-readable medium that stores executable instructions to implement a method of coding an input vector using a three-dimensional subdivision surface having plural faces, each of the plural faces containing a single vector and having a numerical code, the instructions causing a machine to:

receive an input indicative of a level of coding accuracy;

subdivide the subdivision surface in accordance with the input;

identify a face of the subdivision surface that contains a vector that is closest to being parallel to the input vector;

determine if the vector is within a predetermined range of the input vector;

wherein, if the vector is within the predetermined range, the instructions cause the machine to assign the input vector a numerical code comprised of a numerical code of the face and of any faces previously subdivided to obtain the face; and wherein, if the vector is not within the predetermined range of the input vector, the instructions cause the machine to subdivide only the face, leaving other faces of the subdivision surface undivided, to produce a subdivided face and to repeat identifying, determining, and assigning or subdividing using the subdivided face.

11. The article of claim 10, further comprising instructions that cause the machine to:

determine a predicted vector based on the input vector, the predicted vector defining an amount of movement needed to move a next vector toward a reference vector; and code the next vector based on the predicted vector.

12. The method of claim 11, wherein coding comprises:

applying the amount of movement to the next vector;

locating a target vector on the subdivision surface that is within a range of the next vector; and assigning a value associated with the target vector to the next vector.

13. The article of claim 10, further comprising instructions that cause the machine to perform entropy encoding to encode the value of the vector.

14. The article of claim 10, wherein determining if the vector is within a predetermined range of the input vector comprises obtaining a vector dot product of the vector and the input vector.

15. The article of claim 10, further comprising instructions that cause the machine to:

keep track of a number of face subdivisions; and determine if the number of face subdivisions exceeds a predetermined maximum number of face subdivisions;

wherein, if the number of face subdivisions exceeds the predetermined maximum number of face subdivisions, the instructions cause the machine to assign the input vector a numerical code of the face and of any faces previously subdivided to obtain the face regardless of whether the vector is within the predetermined range of the input vector.

16. The article of claim 10, wherein the numerical code comprises a bit pattern, each face and each subdivided face having a same number of bits for a numerical code.

17. An apparatus to implement a method of coding an input vector using a three-dimensional subdivision surface having plural faces, each of the plural faces containing a single vector and having a numerical code, the apparatus comprising circuitry to:

receive an input indicative of a level of coding accuracy;

subdivide the subdivision surface in accordance with the input;

identify a face of the subdivision surface that contains a vector that is closest to being parallel to the input vector;

determine if the vector is within a predetermined range of the input vector;

wherein, if the vector is within the predetermined range, the circuitry assigns the input vector a numerical code comprised of a numerical code of the face and of any faces previously subdivided to obtain the face; and wherein, if the vector is not within the predetermined range of the input vector, the circuitry subdivides only the face, leaving other faces of the subdivision surface undivided, to produce a subdivided face and repeats identifying, determining, and assigning or subdividing using the subdivided face.

18. The apparatus of claim 17, wherein determining if the vector is within a predetermined range of the input vector comprises obtaining a vector dot product of the vector and the input vector.

19. The apparatus of claim 17, wherein the circuitry:

keeps track of a number of face subdivisions; and determines if the number of face subdivisions exceeds the predetermined maximum number of face subdivisions;

wherein, if the number of face subdivisions exceeds a predetermined maximum number of face subdivisions, the circuitry assigns the input vector a numerical code of the face and of any faces previously subdivided to obtain the face regardless of whether the vector is within the predetermined range of the input vector.

20. The apparatus of claim 17, wherein the numerical code comprises a bit pattern, each face and each subdivided face having a same number of bits for a numerical code.

* * * * *